(12) United States Patent
Zhao et al.

(10) Patent No.: US 12,220,834 B2
(45) Date of Patent: Feb. 11, 2025

(54) CHAIN SAW

(71) Applicant: Nanjing Chervon Industry Co., Ltd., Nanjing (CN)

(72) Inventors: Jinbiao Zhao, Nanjing (CN); Hongwei Wang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 741 days.

(21) Appl. No.: 17/328,565

(22) Filed: May 24, 2021

(65) Prior Publication Data
US 2021/0276217 A1    Sep. 9, 2021

Related U.S. Application Data

(63) Continuation of application No. PCT/CN2019/121639, filed on Nov. 28, 2019.

(30) Foreign Application Priority Data

Nov. 28, 2018  (CN) .......................... 201811433127.7
Nov. 28, 2018  (CN) .......................... 201811433129.6

(51) Int. Cl.
*B27B 17/08*     (2006.01)
*B25F 5/00*      (2006.01)
(Continued)

(52) U.S. Cl.
CPC ............. *B27B 17/083* (2013.01); *B25F 5/00* (2013.01); *B27B 17/02* (2013.01); *H02P 3/22* (2013.01); *H02P 6/24* (2013.01)

(58) Field of Classification Search
CPC ....... B27B 17/00; B27B 17/02; B27B 17/083; B27B 17/086; H02P 3/22; H02P 6/18; H02P 6/24
(Continued)

(56) References Cited

U.S. PATENT DOCUMENTS 3,923,126 A * 12/1975 Bidanset ............... B27B 17/083
                                                    30/381
4,152,833 A *  5/1979 Phillips ................ B27B 17/083
                                                    30/382
(Continued)

FOREIGN PATENT DOCUMENTS

CN          101223686 A      7/2008
CN          103068537 A      4/2013
(Continued)

OTHER PUBLICATIONS

ISA/CN, International Search Report issued on PCT application No. PCT/CN2019/121639, dated Mar. 9, 2020, 2 pages.
(Continued)

*Primary Examiner* — Jason Daniel Prone
(74) *Attorney, Agent, or Firm* — Greenberg Traurig, LLP (57) ABSTRACT

Disclosed is a chain saw and a power tool, including a working part, a body, a brushless motor, a power supply device, a drive circuit, a controller, and a motion detection device. The motion detection device is coupled to the body or the working part for detecting a motion of the body or the working part in at least one direction. The controller is configured to control the drive circuit to make the brushless motor enter a braking mode when the amount of the motion of the body or the working part in at least one direction exceeds a predetermined threshold.

17 Claims, 9 Drawing Sheets

(51) Int. Cl.
*B27B 17/02* (2006.01)
*H02P 3/22* (2006.01)
*H02P 6/24* (2006.01)

(58) Field of Classification Search
USPC .................................................. 30/381–387
See application file for complete search history.

(56) References Cited

U.S. PATENT DOCUMENTS

| | | | | |
|---|---|---|---|---|
| 4,553,326 | A * | 11/1985 | West | B27B 17/083 30/381 |
| 5,125,160 | A * | 6/1992 | Gassen | B27B 17/083 30/382 |
| 5,942,975 | A * | 8/1999 | Sørensen | B27B 17/083 340/562 |
| 8,752,301 | B2 * | 6/2014 | George | B27B 17/083 30/381 |
| 10,071,500 | B2 * | 9/2018 | George | B27B 17/083 |
| 11,070,164 | B2 * | 7/2021 | Wang | B23D 49/10 |
| 11,095,238 | B2 * | 8/2021 | Li | H02P 6/16 |
| 11,258,389 | B2 * | 2/2022 | Xu | H02P 6/18 |
| 11,637,523 | B2 * | 4/2023 | Wang | B24B 23/028 361/679.01 |
| 11,791,756 | B2 * | 10/2023 | Xu | B25F 5/00 318/17 |
| 11,835,540 | B2 * | 12/2023 | Trinkle | B27B 17/00 |
| 2004/0181951 | A1 * | 9/2004 | Wittke | B27B 17/083 30/382 |
| 2008/0048597 | A1 | 2/2008 | Tamaoka | |
| 2008/0196565 | A1 | 8/2008 | Eppard | |
| 2010/0064532 | A1 * | 3/2010 | Wittke | B27G 19/003 30/382 |
| 2012/0036725 | A1 * | 2/2012 | Osborne | B27B 17/083 30/383 |
| 2015/0091480 | A1 | 4/2015 | Kischka et al. | |
| 2021/0101304 | A1 * | 4/2021 | Green | B27B 17/083 |
| 2022/0388081 | A1 * | 12/2022 | Larsén | B27B 17/083 |

FOREIGN PATENT DOCUMENTS

| | | | | |
|---|---|---|---|---|
| CN | 104604548 | A | 5/2015 | |
| CN | 105082261 | A | 11/2015 | |
| CN | 107685315 | A | 2/2018 | |
| CN | 108011559 | A | 5/2018 | |
| EP | 1318596 | A2 | 6/2003 | |
| EP | 3872978 | A1 * | 9/2021 | .......... B27B 17/083 |
| WO | WO-2020108569 | A1 * | 6/2020 | .......... B27B 17/083 |

OTHER PUBLICATIONS

EPO, extended European search report issued on European publication No. 3872978, dated Nov. 25, 2021, 11 pages.

* cited by examiner

CHAIN SAW

RELATED APPLICATION INFORMATION

The present application is a continuation of International Application Number PCT/CN2019/121639, filed on Nov. 28, 2019, through which this application also claims the benefit under 35 U.S.C. § 119(a) of Chinese Patent Application No. 201811433127.7, filed on Nov. 28, 2018, and Chinese Patent Application No. 201811433129.6, filed on Nov. 28, 2018, which applications are incorporated herein by reference in their entirety.

BACKGROUND

Nowadays, power tools are widely used in homes, gardens, and other fields. Brushless motors are increasingly used in power tools due to their large torque and high power to meet users' pursuit of high-efficiency and energy-saving power tools, particularly gardening power tools such as chain saws. A chain saw is a gardening tool that uses a power device to drive staggered L-shaped cutters on the saw chain to move laterally to cut wood or branches. Under normal operation of the chain saw, when the cutters are stuck in the workpiece, the continuous rotation of the motor will cause the chain saw to swing upwards, causing the chain saw to rotate backward towards the user's face, leading to an accident. Therefore, it is desired to brake in time to prevent the saw chain from moving in dangerous situations.

Some of the related power tools reduce the occurrence of kickback through improvements on mechanical structure. However, due to the lack of knowledge about when the kickback occurs, the operator cannot adjust the power tool in time (for example, stop the power tool), which may lead to safety accidents.

SUMMARY

An example provides a chain saw. The chain saw includes a working part comprising a guide bar and a saw chain, a body for installing the working part, a brushless motor configured to drive the working part to work, the brushless motor having a driving mode and a braking mode, the brushless motor comprising a rotor and a plurality of windings, a power supply device for providing electrical energy for the brushless motor, a drive circuit connected to the power supply device and the plurality of windings for loading the electric energy of the power supply device to the plurality of windings of the brushless motor, a controller connected to the drive circuit for controlling the drive circuit, and a motion detection device coupled to the body or the working part for detecting a motion of the body or the working part in at least one direction. The controller is configured to control the drive circuit to make the brushless motor enter the braking mode when an amount of the motion of the body or the working part in at least one direction exceeds a predetermined threshold.

In one example, the controller is configured to control the drive circuit to make the brushless motor enter the braking mode when a value of an angular velocity at which the body or the working part rotates in at least one direction is greater than a first predetermined angular velocity threshold and less than a second predetermined angular velocity threshold, and a value of an angular displacement at which the body or the working part rotates in at least one direction is greater than a predetermined angular displacement threshold.

In one example, the controller is configured to control the drive circuit to make the brushless motor enter the braking mode when a value of an angular velocity at which the body or the working part rotates in at least one direction is greater than the second predetermined angular velocity threshold.

In one example, the motion detection device includes a gyroscope sensor for detecting at least one of an angular velocity and an angular displacement at which the body or the working part rotates in at least one direction.

In one example, the controller is configured to control the drive circuit based on a position of the rotor such that a current direction of the plurality of windings in the braking mode is opposite from the current direction in the driving mode.

In one example, the braking mode include a first braking process, the brushless motor has a plurality of commutation positions, and areas between two adjacent ones of the plurality of commutation positions are sectors, and the controller is configured to control the drive circuit to reverse the current direction of the plurality of windings in the first braking process in each of the sectors based on the each of the sectors where the rotor is located.

In one example, the braking mode include a first braking process, the brushless motor has a plurality of commutation positions, and areas between two adjacent ones of the plurality of commutation positions are sectors, and the controller is configured to control the drive circuit to reverse the current direction of the plurality of windings in the first braking process in at least one of the sectors based on the at least one of the sectors where the rotor is located.

In one example, the controller is configured to control the drive circuit to short-circuit the plurality of windings of the brushless motor when a duration of the first braking process has reached a predetermined time period.

In one example, the controller is configured to control the drive circuit to short-circuit the plurality of windings of the brushless motor when a rotational speed of the rotor of the brushless motor has dropped to a predetermined rotational speed threshold after the brushless motor enters the braking mode.

In one example, the braking mode further includes a second braking process, and the controller is configured to control the drive circuit to short-circuit the plurality of windings of the brushless motor in the second braking process.

In one example, the chain saw further includes a position detection device configured to detect a position of the rotor of the brushless motor.

Another example provides a power tool. The power tool includes a working part for realizing a function of the power tool, a body for installing the working part, a brushless motor configured to drive the working part to work, the brushless motor having a driving mode and a braking mode, the brushless motor comprising a rotor and a plurality of windings, a power supply device for providing electrical energy for the brushless motor, a drive circuit connected to the power supply device and the plurality of windings for loading the electric energy of the power supply device to the plurality of windings of the brushless motor, a controller connected to the drive circuit for controlling the drive circuit, and a motion detection device coupled to the body or the working part for detecting a motion of the body or the working part in at least one direction. The controller is configured to control the drive circuit to make the brushless motor enter the braking mode when an amount of the motion of the body or the working part in at least one direction exceeds a predetermined threshold.

In one example, the controller is configured to control the drive circuit to make the brushless motor enter the braking mode when a value of an angular velocity at which the body or the working part rotates in at least one direction is greater than a first predetermined angular velocity threshold and less than a second predetermined angular velocity threshold, and a value of an angular displacement at which the body or the working part rotates in at least one direction is greater than a predetermined angular displacement threshold.

In one example, the controller is configured to control the drive circuit to make the brushless motor enter the braking mode when a value of an angular velocity at which the body or the working part rotates in at least one direction is greater than the second predetermined angular velocity threshold.

In one example, the motion detection device includes a gyroscope sensor for detecting at least one of an angular velocity and an angular displacement at which the body or the working part rotates in at least one direction.

In one example, wherein the braking mode include a first braking process, the brushless motor has a plurality of commutation positions, and areas between two adjacent ones of the plurality of commutation positions are sectors, and the controller is configured to control the drive circuit to reverse the current direction of the plurality of windings in the first braking process in at least one of the sectors based on the at least one of the sectors where the rotor is located.

In one example, the controller is configured to control the drive circuit to short-circuit the plurality of windings of the brushless motor when a duration of the first braking process has reached a predetermined time period.

In one example, the controller is configured to control the drive circuit to short-circuit the plurality of windings of the brushless motor when a rotational speed of the rotor of the brushless motor has dropped to a predetermined rotational speed threshold after the brushless motor enters the braking mode.

In one example, the braking mode further includes a second braking process, and the controller is configured to control the drive circuit to short-circuit the plurality of windings of the brushless motor in the second braking process.

An additional example provides a control method of a power tool. The power tool includes a working part for realizing a function of the power tool, a body for installing the working part, a brushless motor configured to drive the working part to work, the brushless motor having a driving mode and a braking mode, the brushless motor comprising a rotor and a plurality of windings, and a motion detection device coupled to the body or the working part for detecting a motion of the body or the working part in at least one direction. The control method includes obtaining at least one of an angular velocity and an angular displacement of the body or the working part in at least one direction, determining whether at least one of the angular velocity and the angular displacement of the body or the working part in at least one direction exceeds a predetermined threshold, and making the power tool enter the braking mode after determining that at least one of the angular velocity and the angular displacement of the body or the working part in at least one direction exceeds the predetermined threshold.

DETAILED DESCRIPTION

A power tool 10 of the present application may be, but is not limited to, a screwdriver, an electric drill, an angle grinder, a hedge trimmer, a chain saw, and other power tool subject to kickback. As long as the power tool 10 adopts the content of the technical solutions disclosed below, it falls within the protection scope of this application.

In an example, taking a chain saw as an example, the power tool 10 includes a working part 15 and a body 20. The working part includes a guide bar 151 and a saw chain 152. The body includes a housing 11, and a front end of the body is enabled to install the working part 15.

Figure 1:
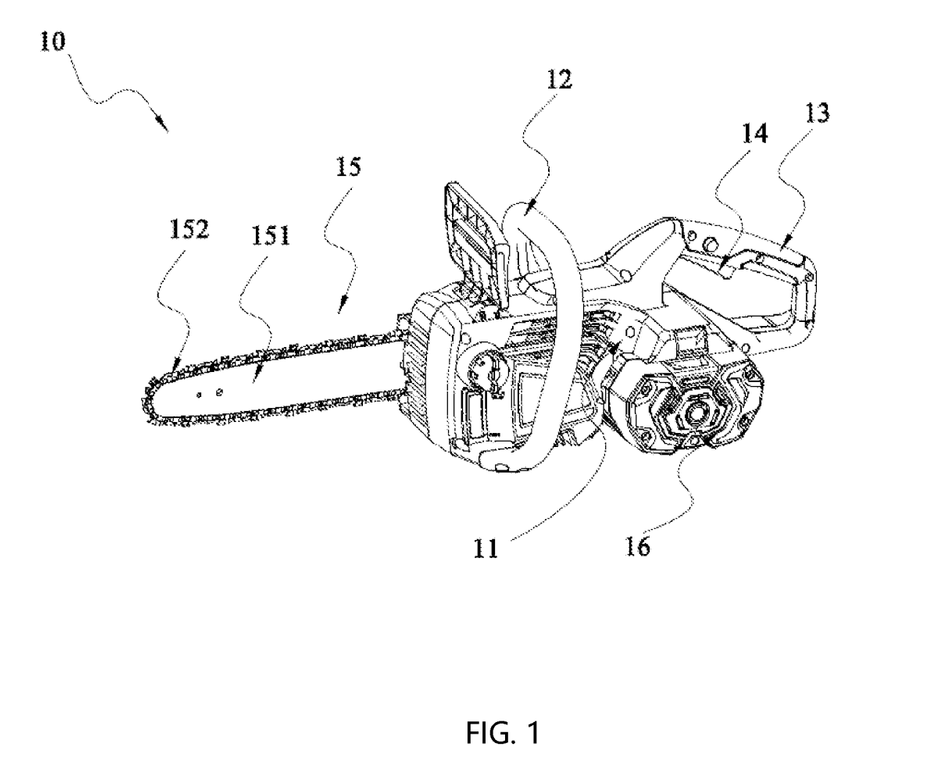
FIG. 1 is a perspective view of the overall structure of a power tool according to an example.
Figure 2:
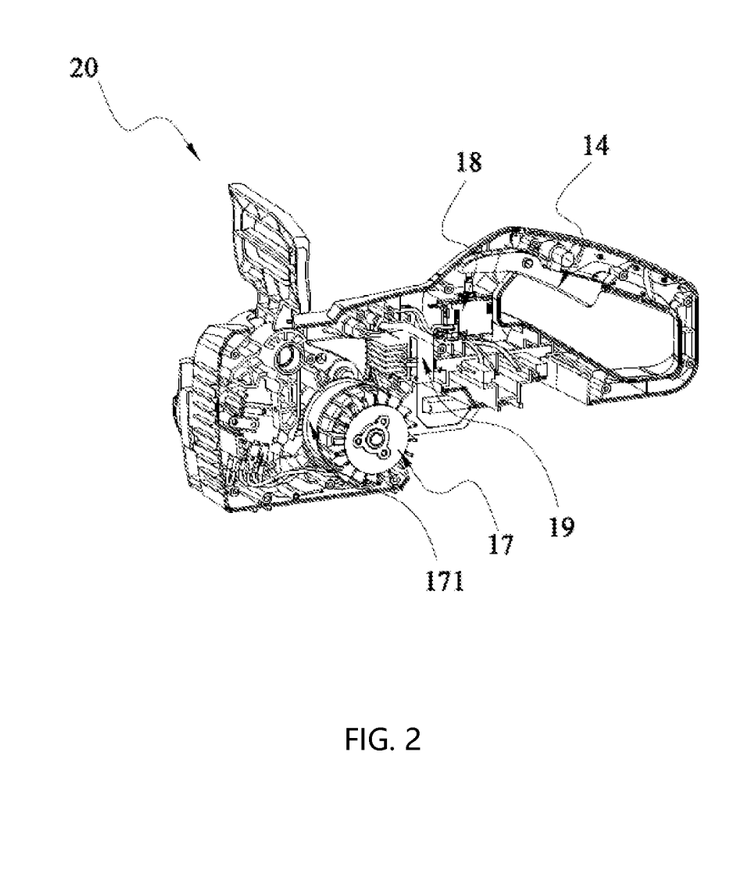
FIG. 2 is a partial cross-sectional view of the power tool shown in FIG. 1.

Referring to FIGS. 1 and 2, the power tool 10 includes the housing 11, a front handle 12 and a main handle 13 arranged on the housing 11, a switch trigger 14 arranged on the main handle 13, the working part 15 for realizing designated functions, and a power supply device 16. It is understandable that the content of this application may also be applied to other power tools, such electric circular saws, electric drills, percussion drills, high-power angle grinders, and other hand-held power tools where kickback may occur.

The working part 15 of the power tool 10 includes the guide bar 151 and the saw chain 152 described above. The saw chain 152 surrounds the edge of the guide bar 151 and is configured to be cyclically guided along the guide bar 151 under the drive of a drive mechanism (not shown). One end of the guide bar 151 is supported by the housing 11 and the other end extends out of the housing in a longitudinal direction of the housing 11.

The switch trigger 14 can be operatively triggered by the user. The switch trigger 14 is coupled to the main switch 18, and the main switch 18 is electrically connected to the main circuit of the power tool 10. When the switch trigger 14 is triggered, the main switch 18 coupled to the switch trigger 14 is triggered accordingly, turning on or off the electrical connection between the circuit components at two ends of the main switch 18.

The power tool 10 also includes a supply device 16 for providing power to the power tool. In some examples, the power tool 10 is powered by a DC power source. More specifically, the power tool 10 is powered by a battery pack, and the power supply device includes a battery pack. In other examples, the power tool 10 is powered by an AC power source. The AC power source may be 120V or 220V AC mains power. The power supply device 16 may include a power conversion circuit. The AC power supply cooperates with some power conversion circuits connected to the AC power supply (not shown). The AC power is converted into electrical energy for the power tool 10 through rectification, filtering, voltage division, and voltage reduction of the AC signal output by the power supply through a hardware circuit. In this example, the power tool 10 is powered by a battery pack, and the voltage output by the battery pack is changed by a specific power circuit (for example, a DC-DC converter chip) to output a power supply voltage suitable for a controller and the like. For the battery pack used as a DC power supply, a corresponding power supply circuit is required.

The housing 11 also includes an automatic lubrication system (not shown). For those of ordinary skill in the art, the specific structures of the front handle 12, the main handle 13, the working part 15, and the lubrication system are common knowledge and will not be described in detail here.

FIG. 2 is a cross-sectional view of the power tool 10 shown in FIG. 1 with the working part 15 and the battery pack removed. The housing 11 is provided with a brushless motor 17 for driving the movement of the saw chain 152, the main switch 18 controlled by the switch trigger 14, the main switch 18 being used to control the start and stop of the power tool 10 during normal operation, and a circuit board 19, the circuit board 19 being provided with electronic components or circuit components, etc.

Figure 3:
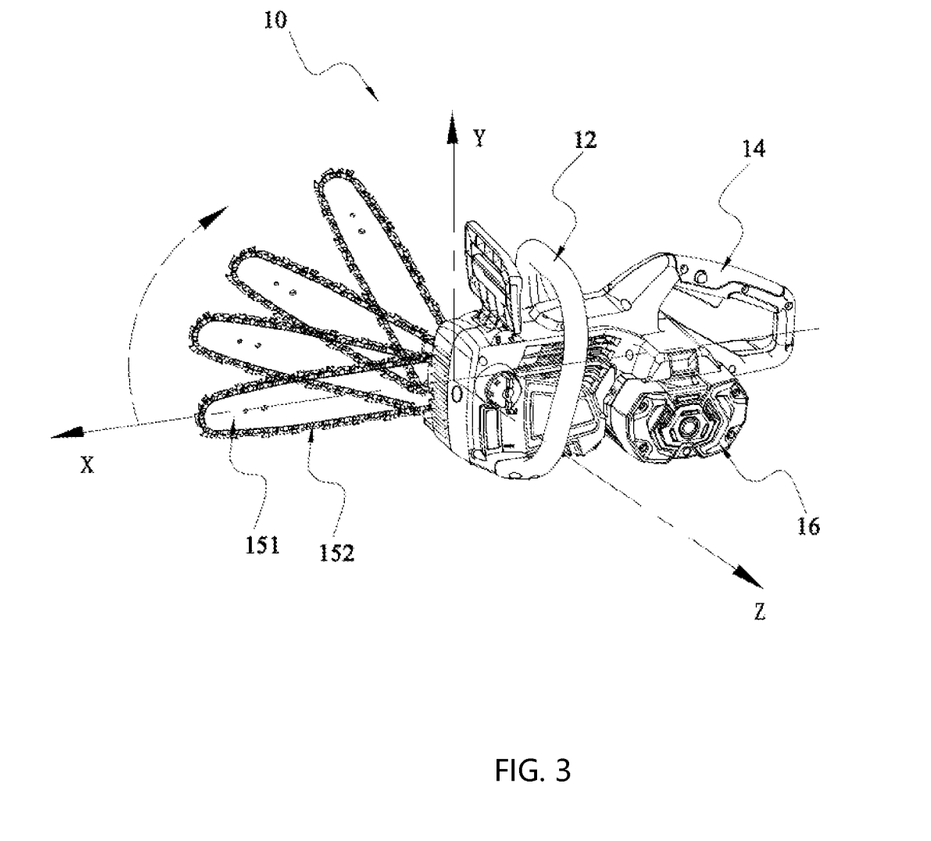
FIG. 3 is a schematic diagram of the power tool shown in FIG. 1 when kickback occurs.

For a chain saw, when the rotating saw chain at the tip of the guide bar 151 comes into contact with logs or branches, the chain saw may rapidly move upward or backward, which is commonly referred to as a kickback. Referring to FIG. 3, when the chain saw kickback occurs, the body 20 or the working part 15 of the chain saw will rotate around the Z axis in the XY plane, and the guide bar 151 and the saw chain 152 will move towards the direction of the operator, which may cause injury to the operator. In order to prevent kickback accidents, it is desired to detect kickback timely and accurately, and brake quickly after detecting a kickback in order to avoid safety accident to the greatest extent possible.

Figure 4:
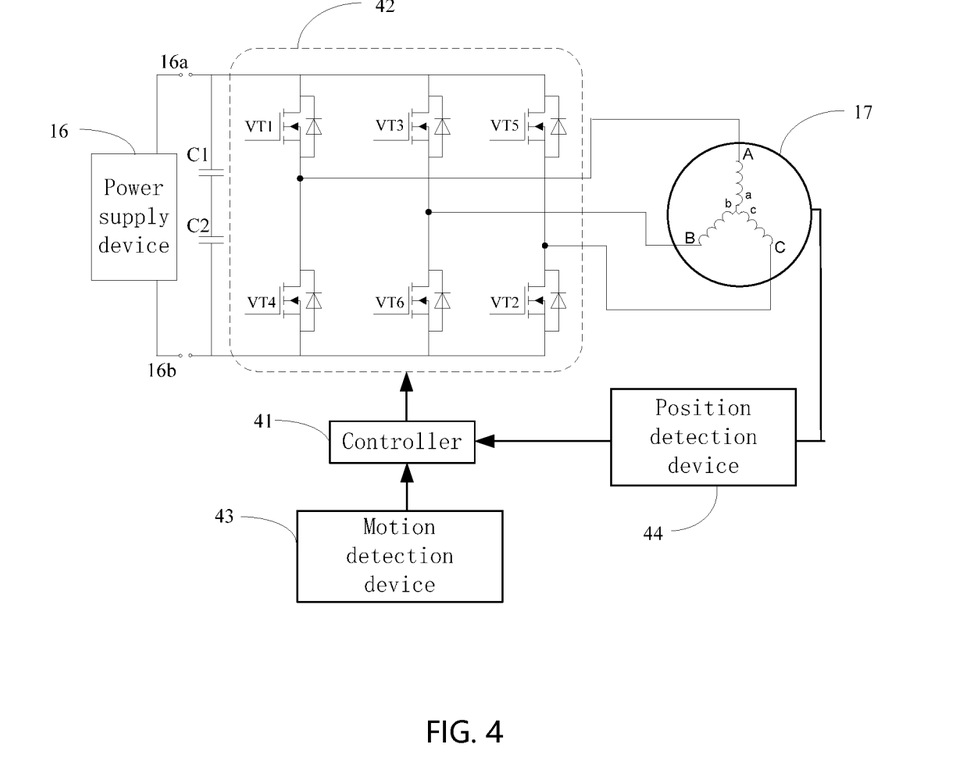
FIG. 4 is a circuit diagram of a circuit system according to an example.

The operation of the above-mentioned power tool 10 also needs to rely on electronic components or circuit components arranged on the circuit board 19. Referring to FIG. 4, the electronic components or circuit components of the power tool 10 may specifically include a controller 41 and a drive circuit 42 as follows. In this example, the power tool 10 further includes a motion detection device 43 and a rotor position detection device 44. The controller 41, the drive circuit 42, the motion detection device 43, the rotor position detection device 44, and the brushless motor 17 are all enclosed by the housing 11. The controller 41, the drive circuit 42, the motion detection device 43, the rotor position detection device 44, the brushless motor 17, the battery pack 16, and the like are electrically connected to form the circuit system of the power tool 10.

The brushless motor 17 outputs power to drive the working part 15 to work. The brushless motor 17 includes a stator, a rotor 171, a motor shaft, and windings. The motor shaft is driven by the rotor 171 of the brushless motor 17. The rotor 171 rotates relative to the stator, and the stator has a stator core and stator windings wrapped around the stator core. In this example, the brushless motor 17 has three-phase windings, which are a first-phase winding A, a second-phase winding B, and a third-phase winding C, respectively.

The drive circuit 42 is electrically connected to the brushless motor 17 for driving the rotor 171 of the brushless motor 17 to rotate. The drive circuit 42 is specifically electrically connected to the three-phase windings of the brushless motor 17 to drive the brushless motor 17 to rotate.

The drive circuit 42 specifically includes switching elements. As shown in FIG. 4, the drive circuit 42 includes switching elements VT1, VT2, VT3, VT4, VT5, and VT6. The switching elements VT1, VT2, VT3, VT4, VT5, and VT6 compose a three-phase bridge, wherein VT1, VT3, and VT5 are upper bridge switches, VT2, VT4, and VT6 are lower bridge switches, and the switching elements can be field effect transistors, IGBT transistors, etc. The gate of each switching element is electrically connected to the drive signal output terminal of the controller 41, and the drain or source of each switching element is electrically connected to the winding of the brushless motor 17. The conduction states of switching elements are changed according to the driving signal output by the controller 41, thereby changing the voltage state applied by the battery pack 16 to the windings of the brushless motor 17, driving the operation of the brushless motor 17.

In order to make the brushless motor 17 rotate, the drive circuit 42 has multiple driving states. In one driving state, the stator windings of the motor generate a magnetic field. The controller 41 is configured to output a corresponding drive signal according to the rotational position of the rotor the brushless motor 17 to the drive circuit 42 to switch the driving state of the drive circuit 42 so as to change the voltage state loaded on the winding of the brushless motor 17 and generate an alternating magnetic field to drive the rotor to rotate, thereby driving the brushless motor 17.

The power tool 10 further includes the position detection device 44 for detecting the position of the rotor 171 of the brushless motor 17. The position detection device 44 may adopt sensorless detection or sensor detection.

In one example, the position detection device 44 includes a position sensor. The position sensor may be, for example, three Hall sensors (not shown), which are arranged along a circumferential direction of the rotor 171 of the brushless motor 17. The position information of the rotor detected by the Hall sensors is input to the position detection device 44. Through logic processing, the position detection device 44 converts the inputted rotor position into the rotor position information that can be communicated with the controller 41 and inputs it to the controller 41. When the rotor rotates into and out of a predetermined range, the signal of the Hall sensor changes, and the output signal of the position detection device 44 also changes accordingly.

When the rotor rotates into the predetermined range, the output signal of the position detection device 44 is defined as 1, and when the rotor rotates out of the predetermined range, the output signal of the position detection device 44 is defined as 0. The three Hall sensors are placed at a physical angle of 120° from each other.

Figure 5:
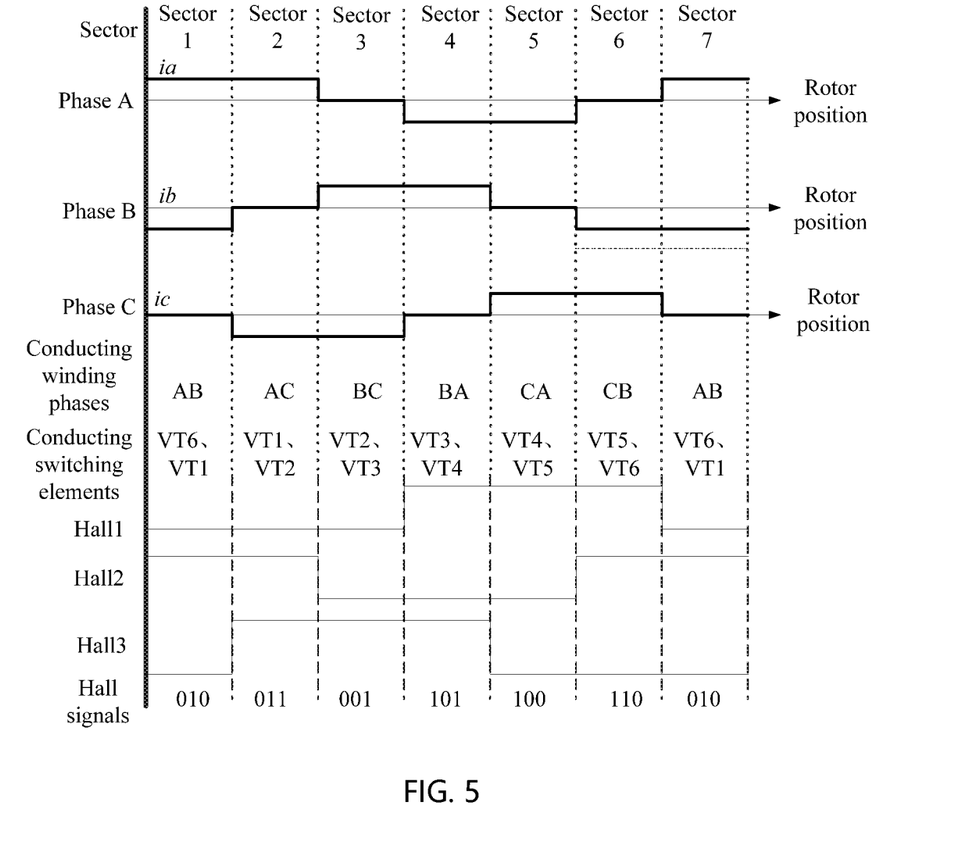
FIG. 5 is a diagram showing the relationship between a Hall signal, a conduction switch, conduction windings and a sector where a rotor is located in a driving state of the circuit system shown in FIG. 4.

Referring to FIG. 5, when the rotor 171 rotates, the three hall sensors can generate position signals including six combinations of signals such that the position detection device 44 outputs a position signal from one of the six combinations of signals. If arranged in the order in which the Hall sensors are placed, there will be six different combinations of signals: 100, 110, 010, 011, 001, and 101. In this way, the position detection device 44 can output one of the above six position signals, and the position of the rotor 171 can be known from the position signal detected and output by the position detection device 44. For the brushless motor 17 with three-phase windings, its six driving states in one conduction period corresponds to the output signals generated by the above solution. Therefore, the brushless motor 17 performs a commutation when the signal output by the position detection device 44 changes. Obviously, the brushless motor 17 commutates once every 60° the rotor 171 rotates. Hereinafter, the interval from one commutation to the next commutation of the brushless motor 17 is defined as one sector. In other words, the brushless motor 17 has a plurality of commutation positions, and the area between each commutation position is a sector.

For the convenience of description, the driving state of the drive circuit 42 is represented by connected terminals of the drive circuit below. For example, if the controller 41 controls the switching elements of the drive circuit 42 such that the first-phase winding A is connected to the positive pole 16a of the power supply and the second-phase winding B is connected to the negative pole 16b of the power supply, the driving state is represented by AB; if the controller 42 controls the switching elements of the drive circuit 42 such that the first-phase winding A is connected to the negative pole 16b of the power supply and the second-phase winding B is connected to the positive pole 16a of the power supply, the driving state is represented by BA. A driving mode represented in this way is also applicable to a triangular connection of the windings. In addition, the switching of the driving state can also be simply referred to as the commutation of the brushless motor.

According to the above definition, referring to FIGS. 4 and 5, when the rotor 171 of the brushless motor 17 rotates, the switching elements of the drive circuit 42, the signals of the Hall sensors, and the sector representing the position of the rotor correspond as shown in Table 1 below:

TABLE 1

| Rotor sector position | 1 | 2 | 3 | 4 | 5 | 6 |
|---|---|---|---|---|---|---|
| Hall signals | 010 | 011 | 001 | 101 | 100 | 110 |
| Conducting switching elements | VT6 VT1 | VT1 VT2 | VT2 VT3 | VT3 VT4 | VT4 VT5 | VT5 VT6 |
| Conducting winding phases | AB | AC | BC | BA | CA | CB |

In some other examples, the position detection device 44 does not include a position sensor, but obtains the position of the rotor indirectly by calculating the back-EMF signal or the bus current of the motor and/or the terminal voltage of the motor, which will not be repeated herein. Those skilled in the art can easily figure it out from knowledge in this field.

The controller 41 is electrically connected to the drive circuit 42 for outputting the drive signal to control the operation of the drive circuit 42. In some examples, the controller 41 uses a dedicated control chip, for example, a Microcontroller Unit ("MCU"). The control chip includes a storage unit for storing braking programs and driving programs. The controller 41 can control the circuit state of the entire power tool 10 and realize various electronic functions, such as soft start, braking, battery protection, and so on.

The power tool 10 further includes the motion detection device 43, the motion detection device 43 is coupled to the body 20 or the wording part 15 of the power tool 10, for detecting the motion of the body 20 or the working part 15 in at least one direction, such as motion amount, motion speed, rotational angular velocity, and rotational angular displacement.

An output terminal of the motion detection device 43 is connected to the controller 41 for transmitting the detected result to the controller 41. When the motion detection device 43 detects the amount of the motion of the body 20 or the working part 15 in at least one direction exceeds a predetermined threshold value, the controller 41 controls the drive circuit 42 to make the brushless motor 17 enter the braking mode.

Through the movement detection device 43, the controller 41 detects the movement change amount of the body 20 or the working part of the power tool 10 in at least one direction and compares it with a predetermined threshold to determine whether the power tool 10 has a kickback. If it exceeds the predetermined threshold, it is determined that the power tool 10 has a kickback, thus, the controller 41 controls the power tool 10 to enter the braking mode and perform emergency braking to avoid safety accidents.

In one example, the motion detection device 43 may specifically include a gyroscope sensor. More specifically, the gyroscope sensor is a MEMS9 (Micro Electro Mechanical System) multi-axis gyroscope sensor for detecting at least one of the angular velocity and the angular displacement at which the body 20 or the working part 15 rotates in at least one direction. For example, at least one of the angular velocity and the angular displacement at which the body 20 or the working part 15 rotates about the Z axis is detected. MEMS gyroscope sensors are small and could be easily integrated into existing circuits, and output a voltage that the sensor can scale.

In some examples, the gyroscope sensor may be installed on the body 20 of the power tool 10. For a chain saw, when kickback occurs, the front handle is close to the center of rotation. In order to measure a larger angular velocity or displacement, the gyroscope sensor can be installed in a position away from the front handle 12, such as the front end of the guide bar 151, and the main handle 13. The selection of the installation position of the gyroscope sensor should ensure the accurate detection of at least one of the angular velocity and the angular displacement of the rotation of the body 20 or the working part 15 of the power tool 10, which is not limited herein. In some examples, the gyroscope sensor measures the angular velocity of the power tool 10 and obtains the angular displacement with an integral operation on the angular velocity. When at least one of the angular velocity and the angular displacement detected by the gyroscope sensor exceeds a predetermined threshold, the controller 41 controls the drive circuit 42 to make the brushless motor 17 enter the braking mode.

In an example, the gyroscope sensor is configured to detect the angular velocity and the angular displacement at which the body 20 or the working part 15 rotates in at least one direction, and the controller 41 is configured to: when the value of the angular velocity is greater than a first predetermined angular velocity threshold and less than a second predetermined angular velocity threshold, and the value of the angular displacement is greater than a predetermined angular displacement threshold, control the drive circuit 42 make the brushless motor 17 enter the braking mode.

Optionally, when the gyroscope sensor detects that the value of the rotational angular velocity W of the power tool 10 is greater than or equal to the first predetermined angular velocity threshold TW1 and less than or equal to the second predetermined angular velocity threshold TW2, and the rotational angular displacement θ is greater than or equal to the predetermined angular displacement threshold TO, the controller 41 controls the switching elements of the drive circuit 42 to make the brushless motor 17 enter the braking mode.

In another example, the gyroscope sensor is configured to detect the angular velocity at which the body 20 or the working part 15 rotates in at least one direction; the controller 41 is configured to control the drive circuit 42 to make the brushless motor 17 enter the braking mode when the value of the angular velocity is greater than the predetermined angular velocity threshold. If the angular velocity W at which the power tool 10 rotates is very large, for example, greater than the second predetermined angular velocity threshold TW2, there is no need to look at the angular displacement θ, instead, it can be determined right away that a kickback has occurred. Therefore, when the gyroscope sensor detects that the angular velocity W of the power tool 10 is greater than the second predetermined angular velocity TW2, the controller 41 controls the switching elements of the drive circuit 42 to make the brushless motor 17 enter the braking mode.

Figure 6:
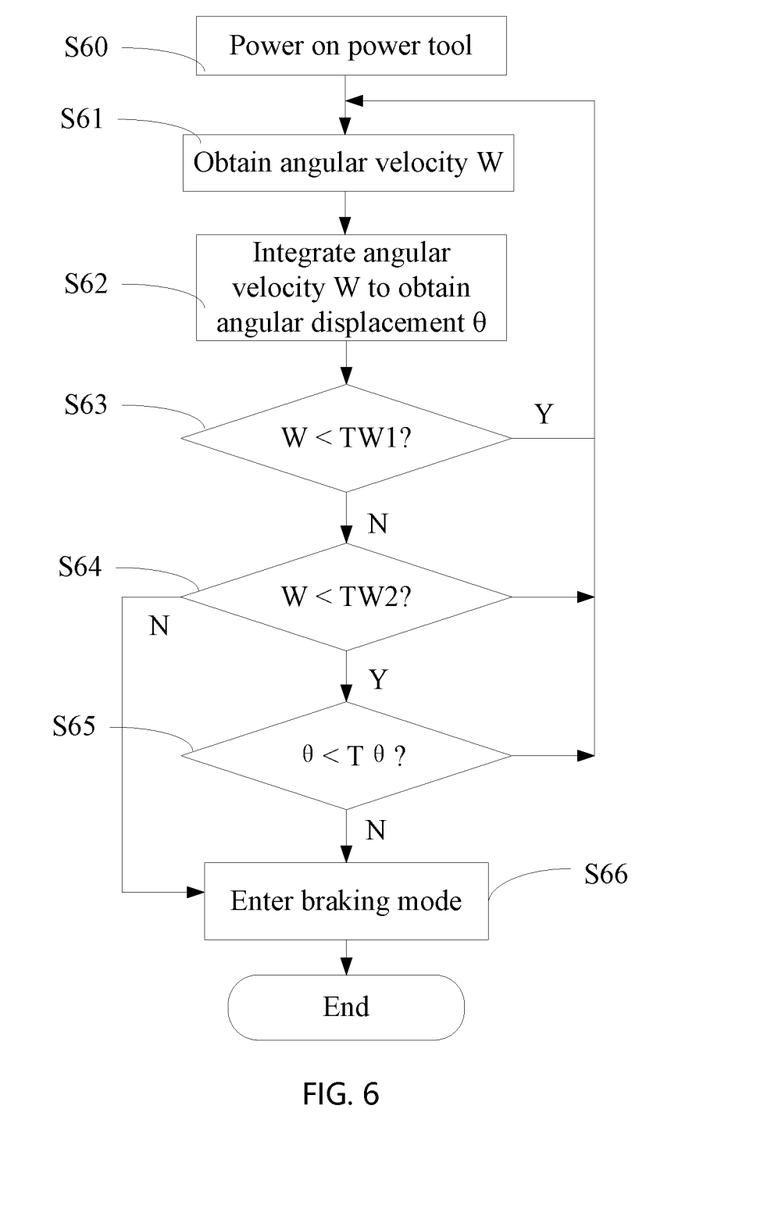
FIG. 6 is a flowchart of a control method of a power tool when detecting kickback according to an example.

Referring to FIG. 6, in an example, the control method of the power tool 10 includes the following steps:

Step S60: Power on the power tool;

Step S61: Obtain the rotational angular velocity W collected by the gyroscope sensor;

Optionally, the gyroscope sensor detects the angular velocity W at which the body 20 or the working part 15 rotates about the Z axis.

Step S62: Integrate the rotational angular velocity W to obtain the angular displacement θ;

The controller 41 performs an integral operation on the obtained rotational angular velocity W to obtain the angular displacement θ at which the body 20 or the working member 15 rotates about the Z axis.

Step S63: Compare and determine whether the rotational angular velocity W is less than the first predetermined angular velocity threshold TW1, if yes, go to step S61; otherwise, go to step S64;

The controller 41 first compares the obtained angular velocity W with the first predetermined angular velocity threshold TW1, and if the angular velocity W is less than the first predetermined angular velocity threshold TW1, proceed to step S61 and continue to obtain the angular velocity; otherwise, proceed to step S64.

Step S64: Compare and determine whether the rotational angular velocity W is less than the second predetermined angular velocity threshold TW2, if yes, go to step S65; otherwise, go to step S66;

If the angular velocity W is greater than or equal to the first predetermined angular velocity threshold TW1, then compare the angular velocity W with the second predetermined angular velocity threshold TW2. If the angular velocity W is less than the second predetermined angular velocity threshold TW2, then go to step S65 to determine the magnitude of the angular displacement θ; if the angular velocity W is greater than or equal to the second predetermined angular velocity threshold TW2, then go to step S66, which enters the braking mode directly.

Step S65: Compare and determine whether the angular displacement θ is less than the predetermined angular displacement T0, if yes, go to step S61; otherwise, go to step S66;

Step S66: Enter the braking mode.

The above-described example adopts a gyroscope sensor as the motion detection device 43 for detecting the angular velocity and the angular displacement of the rotation of the body 20 or the working member 15 of the power tool 10 to determine if the power tool 10 has a kickback, avoiding the defect of traditional measurements of acceleration using accelerometers, which causes kickback detection to be sensitive to vibration. In this example, the kickback detection implementation method and subsequent data processing are simpler, the vibration interference is small, and the kickback detection is more accurate. The first predetermined angular velocity threshold TW1, the second predetermined angular velocity threshold TW2, and the predetermined angular displacement T0 may be selected by the user according to the actual situation, so that the detection result can accurately reflect the occurrence of kickback, which is not limited herein.

The power tool 10 includes a driving mode and a braking mode. In the driving mode, the controller 41 executes a driving program and controls the switching elements of the drive circuit 42 to rotate the rotor 171 of the brushless motor 17. In the braking mode, the controller 41 executes a braking program and controls the switching elements of the drive circuit 42 to make the brushless motor 17 enter the braking mode.

After detecting the occurrence of kickback, the power tool 10 emergently enters the braking mode to avoid safety accidents. A chain saw with a three-phase motor generally adopts short-circuit braking. When braking, the windings of the motor are short-circuited, that is, the controller 41 controls all the upper bridge switching elements or all the lower bridge switching elements of the drive circuit 42 to be turned on, connecting the ends of the phase windings connected to the neutral point to each other, so that the phase windings are short-circuited. In this way, the resistance of the windings themselves consumes energy. Because the resistance of the windings is small, the energy consumption is very fast, so there is a certain degree of risk that the motor may be burned. In addition, when the linear speed of the chain saw becomes higher, the time required for short-circuit braking will also become longer. If the power tool 10 has a kickback, short-circuit braking cannot brake rapidly, which does not meet the safety requirements in the case of kickback.

In the braking mode of the present application, the controller 41 controls the drive circuit 42 based on the position of the rotor 171 such that the current direction of the winding is opposite from the current direction in the driving mode.

In an example, after the brushless motor 17 enters the braking mode, when the duration of the braking mode reaches a predetermined time period, the controller 41 controls the switching elements of the drive circuit 42 to short-circuit the windings of the brushless motor 17.

In another example, after the brushless motor 17 enters the braking mode, when the rotational speed of the rotor 171 of the brushless motor 17 drops to a predetermined threshold, controls the switching elements of the drive circuit 42 to short-circuit the windings of the brushless motor 17.

Optionally, when the chain saw enters the braking mode, the linear speed of the chain saw is greater than or equal to 15 m/s.

In this example, the braking mode includes a first braking process and a second braking process. In the first braking process, the controller 41 controls the switching elements of the drive circuit 42 based on the position of the rotor 171 to make the current of each sector of each phase of the windings during braking opposite from the direction of the current of the windings in the driving mode to generate a reverse torque for braking the brushless motor 17, until a predetermined condition is met, the controller 41 controls the power tool 10 to switch to the second braking process. In this example, the second braking process adopts short-circuit braking to brake the brushless motor 17. Specifically, the controller 41 controls the drive circuit 42 to short-circuit the windings of the brushless motor 17 for braking.

The predetermined condition may include: the duration of the first braking process reaches a predetermined duration or the rotational speed of the rotor 171 of the brushless motor 17 drops to a predetermined rotational speed threshold or less than the predetermined rotational speed threshold.

Figure 7:
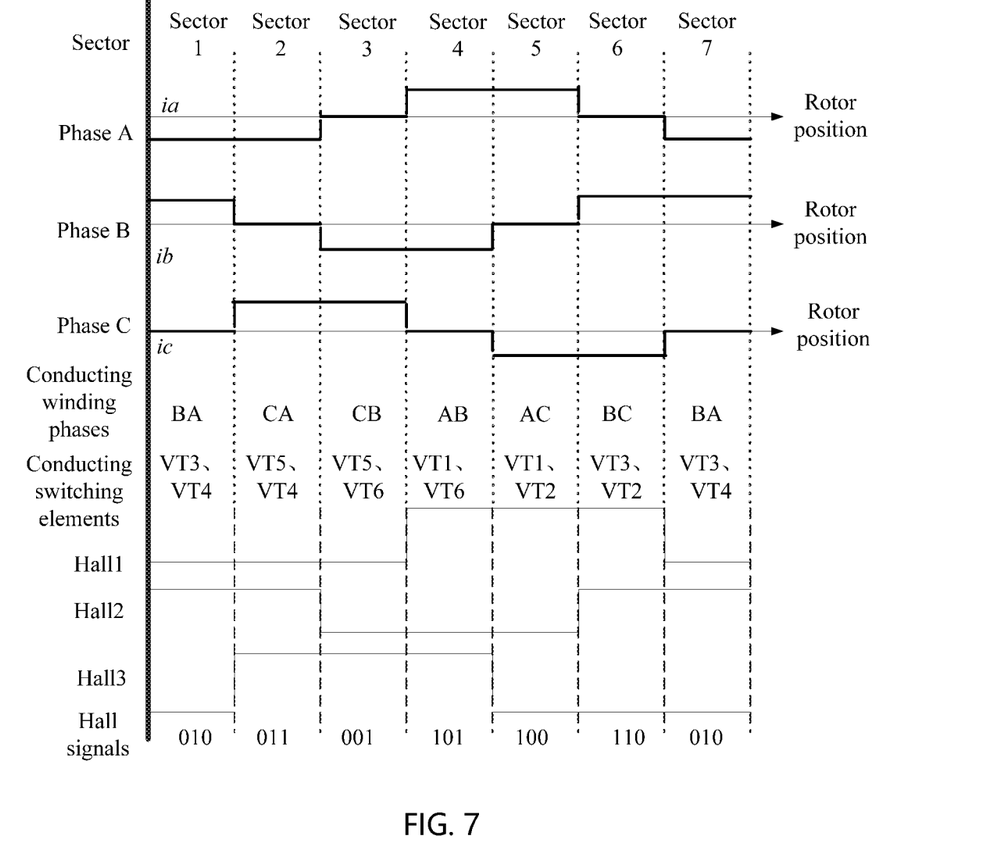
FIG. 7 is a diagram showing the relationship between the Hall signal, the conduction switch, the conduction windings, and the sector where the rotor is located in a braking state of the circuit system shown in FIG. 4.

Referring to FIGS. 4 and 7, in a specific example, the position detection device 44 includes Hall sensors, and the brushless motor adopts a Y connection. In the first braking process, after a kickback is detected, the Hall sensors detect the position of the rotor 171 in real time. When the rotor rotates to sector 1, the position detection device 44 outputs the signal 010. In the braking mode, at this time, the drive circuit 42 should be controlled to conduct phase BA. Correspondingly, the controller 41 turns on the switching elements VT3 and VT4, and turns off the other switching elements, so that the current direction of phase winding A and phase winding B are opposite from the current direction in the driving mode. When the rotor rotates to sector 2, the position detection device 44 outputs the signal 011. At this time, the drive circuit 42 should be switched to CA conduction. Correspondingly, the controller 41 turns on the switching elements VT4 and VT5, and turns off the other switching elements, and so on, until the rotational speed of the rotor 171 drops to the predetermined rotational speed threshold or the duration of the first braking process reaches the predetermined time period, at which time it switches to the second braking process. Of course, in the first braking process, the current direction of the windings in all sectors can be opposite from the current direction in the driving mode to achieve rapid braking; alternatively, the current direction of the windings in some sectors less than all sectors can be opposite from the current direction in the driving mode. The braking time adjustment could be achieved by changing the number of sectors to have opposite current directions from the driving mode during the first braking process. The more the number of sectors, the shorter the braking time is. The less the number of sectors, the longer the braking time is.

That is, during the first braking process, the conduction states of the switching elements of the drive circuit 42 is controlled by the controller 41 to achieve the braking of the brushless motor 17. By changing the conduction states of the switching elements, the current direction of the windings during the first braking process are opposite from the current direction in the driving mode, so that the brushless motor 17 rotates reversely. The duration of this braking process can be realized by software. By outputting a fixed or varying duty cycle, when the rotational speed of the brushless motor 17 or the rotational speed of the rotor 171 drops to the predetermined rotational speed threshold or the duration of the first braking process reaches the predetermined time period, switch to the second braking process, thus, the braking time is adjustable. The braking time could be made shorter to achieve a better braking effect.

In the first braking process, the relationship between the rotor sector position, Hall signals, conducting switching elements, and conducting winding phases is shown in Table 2 below. This table can be stored in the memory, and the controller 41 can execute the first braking process according to this table.

TABLE 2

| Rotor sector position | 1 | 2 | 3 | 4 | 5 | 6 |
|---|---|---|---|---|---|---|
| Hall signals | 010 | 011 | 001 | 101 | 100 | 110 |
| Conducting switching elements | VT3 VT4 | VT5 VT4 | VT5 VT6 | VT1 VT6 | VT1 VT2 | VT3 VT2 |

TABLE 2-continued

| Rotor sector position | 1 | 2 | 3 | 4 | 5 | 6 |
|---|---|---|---|---|---|---|
| Conducting winding phases | BA | CA | CB | AB | AC | BC |

In the first braking process, the braking time is adjustable, but it is impossible to determine when the motor stops rotating. In this example, after entering the first braking process, switch to the second braking process when the rotational speed of the brushless motor 17 or the rotational speed of the rotor 171 drops to the predetermined rotational speed threshold or the duration of the first braking process reaches the predetermined time period can prevent the rotor 171 of the brushless motor from continuing to rotate in the opposite direction. The braking time in the first braking process could be adjusted to achieve rapid braking.

In the second braking process, the controller 41 turns on all the upper bridge switching elements VT1, VT2 and VT3 or all the lower bridge switching elements VT4, VT6 and VT2 to short-circuit the three-phase windings. The inertia rotation of the brushless motor 17 will generate a reverse torque, which will make the brushless motor 17 stop quickly. Since the second braking process adopts short-circuit braking, all the windings of the brushless motor 17 are short-circuited, and the kinetic energy of the brushless motor 17 is consumed on the windings. Since the resistance of the windings is relatively small, a large short-circuit current will be generated, the kinetic energy of the brushless motor 17 is quickly released, so that the brushless motor 17 instantly generates a large braking torque, achieving the effect of rapid braking.

In this example, in the first braking process, by switching to the second braking process when the predetermined condition is met, the brushless motor 17 can be quickly stopped and the braking process is safer and more reliable.

Figure 8:
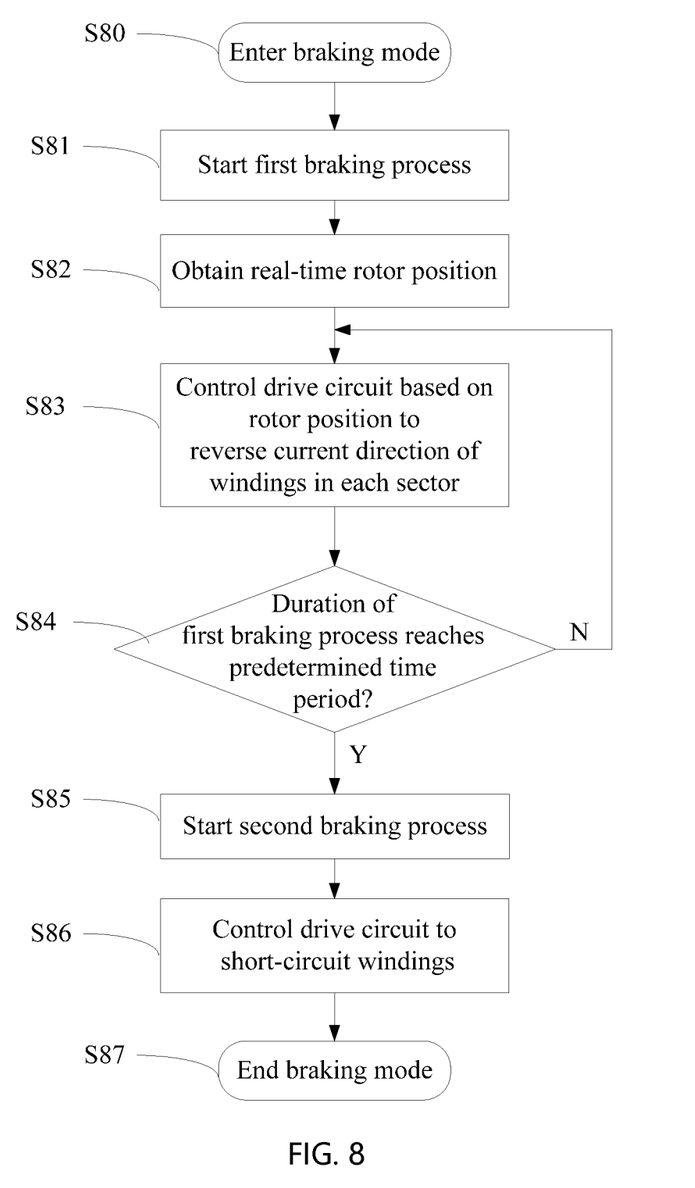
FIG. 8 is a flowchart of a control method of a power tool during braking according to an example.

Referring to FIG. 8, in an example, the braking method of the power tool 10 includes the following steps:

S80: Enter the braking mode;

When the controller 41 determines that the power tool 10 has a kickback according to the rotational angular velocity W collected by the gyroscope sensor and the rotational angular displacement θ obtained by integrating the rotational angular velocity W, it enters the braking mode.

S81: Start the first braking process;

In the braking mode, the controller 41 first starts the first braking process and executes the first braking program;

S82: Obtain the real-time position of the rotor;

The position detection device 44 detects the position of the rotor in real time. In an implementation, the position of the rotor is detected by Hall sensors. When the rotor rotates to a preset range that can be detected by a Hall sensor, the position sensor is in one signal state. When the rotor rotates out of the preset range, the position sensor switches to another signal state. The signals of the Hall sensors are output to the position detection device 44. Through logic processing, the position detection device 44 converts the input rotor position into rotor position information that can be communicated with the controller 41 and inputs it to the controller 41. The controller 41 determines the current sector position of the rotor according to the signals of the Hall sensors.

S83: Control the drive circuit according to the rotor position to reverse the current direction of the windings in each sector;

According to the current sector position of the rotor and the relation table (Table 2) of the rotor sector position, Hall signals, and conducting switch elements during the first braking process stored in the memory in advance, the controller 41 controls the drive circuit 42 to turn on or off the corresponding switching elements, so as to reverse the current direction of the windings in each sector from the current direction in the driving mode, thereby generating a reverse torque for braking the brushless motor 17.

S84: Determine whether the duration of the first braking process has reached the predetermined time period, if yes, go to step S85; if not, go to step S83;

Optionally, the power tool 10 includes a timer or clock. The timer or clock may be built-in to the controller 41 or externally installed to the controller 41. The timer or clock is configured to determine the duration of the first braking process. In some specific examples, when entering the braking mode, the timer or clock starts to work. When the duration of the first braking process reaches the predetermined time period, go to step S84; otherwise, go to step S83, and then continue to maintain the first braking process.

S85: Start the second braking process;

When it is determined that the duration of the first braking process has reached the predetermined time period, the controller 41 starts the second braking process.

S86: Control the switching elements of the drive circuit to short-circuit the windings;

The controller 41 turns on all the lower-bridge switching elements or all the upper-bridge switching elements of the drive circuit 42, so that the three-phase windings are short-circuited. The kinetic energy of the brushless motor 17 is consumed on the windings, and the resistance on the windings is relatively small, bringing a large short-circuit current; the kinetic energy of the brushless motor 17 is quickly released, so that the brushless motor 17 instantly generates a large braking torque, which can achieve the effect of rapid braking.

S87: End the braking mode.

Figure 9:
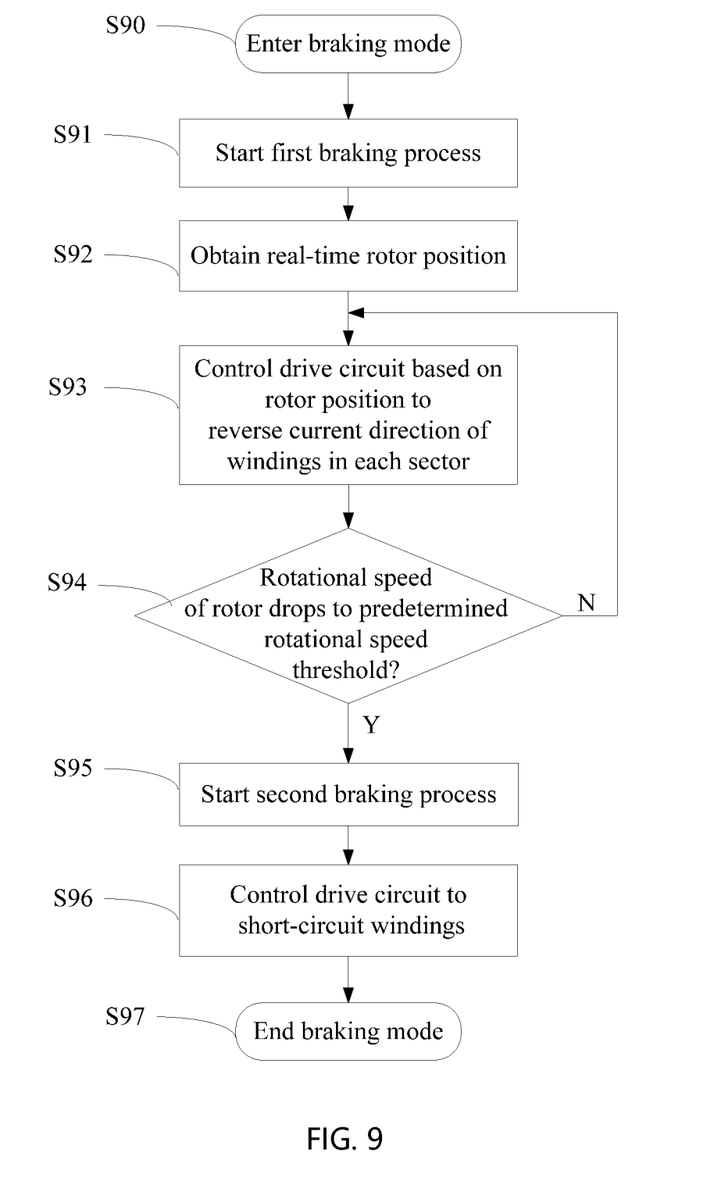
FIG. 9 is a flowchart of a control method of a power tool during braking according to another example.

Referring to FIG. 9, according to another example, the braking method of the power tool 10 includes the steps of:

S90: Start the braking mode;

When the controller 41 determines that the power tool 10 has a kickback according to the rotational angular velocity W collected by the gyroscope sensor and the rotational angular displacement θ obtained by integrating the rotational angular velocity W, it enters the braking mode.

S91: Start the first braking process;

In the braking mode, the controller 41 first starts the first braking process and executes the first braking program;

S92: Obtain the real-time position of the rotor;

The position detection device 44 detects the position of the rotor in real time. In this example, the position of the rotor is detected by Hall sensors. When the rotor rotates to a preset range that can be detected by a Hall sensor, the position sensor is in one signal state. When the rotor rotates out of the preset range, the position sensor switches to another signal state. The signals of the Hall sensors are output to the position detection device 44. Through logic processing, the position detection device 44 converts the input rotor position into rotor position information that can be communicated with the controller 41 and inputs it to the controller 41. The controller 41 determines the current sector position of the rotor according to the signals of the Hall sensors.

S93: Control the switching elements of the drive circuit according to the rotor position to reverse the current direction of the windings in each sector;

According to the current sector position of the rotor and the relation table (Table 2) of the rotor sector position, Hall signals, and conducting switch elements during the first braking process stored in the memory in advance, the controller 41 controls the drive circuit 42 to turn on or off the corresponding switching elements, so as to reverse the current direction of the windings in each sector from the current direction in the driving mode, thereby generating a reverse torque for braking the brushless motor 17.

S94: Determine whether the rotational speed of the rotor has dropped to a predetermined value, if yes, go to step S95; if not, go to step S93;

The power tool 10 includes a speed detection device, which is configured to detect the rotational speed of the rotor 171 or the rotational speed of the motor shaft and send the detected result to the controller 41. The speed detection device can be built-in to the controller 41 or externally installed to the controller 41. The controller 41 compares the rotational speed detected by the speed detection device to the predetermined value to determine if the rotational speed of the rotor 171 has dropped to the predetermined rotational speed threshold, if yes, then go to step S95; if not, go to step S93 to continue the braking control.

S95: Start the second braking process;

When it is determined that the rotational speed of the rotor 171 has dropped to the predetermined rotational speed threshold, the controller 41 switches to the second braking process.

S96: Control the drive circuit to short-circuit the windings;

The controller 41 turns on all the lower-bridge switching elements or all the upper-bridge switching elements of the drive circuit 42, so that the three-phase windings are short-circuited. The kinetic energy of the brushless motor 17 is consumed on the windings, and the resistance on the windings is relatively small, bringing a large short-circuit current; the kinetic energy of the brushless motor 17 is quickly released, so that the brushless motor 17 instantly generates a large braking torque, which can achieve the effect of rapid braking.

S97: End the braking mode.

In experimentation, taking the chain saw as an example, when the linear speed of the saw chain is 18.973 m/s, the braking time with traditional short-circuit braking is 153.4 ms, and the braking time of the presented method is 93.4 ms. Therefore, compared with traditional braking approach, the braking time of the presented method is less than that of traditional short-circuit braking mode, and meets the safety requirement of a braking time less than 0.12 s, which effectively avoids safety accidents caused by kickback.

In the examples of the present application, the working part 15 is directly driven by the brushless motor 17. In consideration of design requirements, in other examples, a gear transmission assembly (not shown) connected to the brushless motor 17 may also be provided.

What is claimed is:

1. A chain saw, comprising:
   a body;
   a working part mounted to the body, the working part comprising a guide bar and a saw chain;
   a brushless motor mounted within the body and coupled to the working part to drive the working part to work, the brushless motor having a driving mode and an emergency, braking mode, the brushless motor comprising a rotor;

a power supply device mountable to the body and electrically coupleable to the brushless motor to provide an electrical energy for the brushless motor;

a drive circuit connected to the power supply device and the brushless motor, the drive circuit providing an operating electrical current to the brushless motor in the driving mode to operate the working part, and the drive circuit providing a braking electrical current to the brushless motor in the braking mode to stop movement of the working part;

a controller connected to the drive circuit for controlling the drive circuit; and a motion detection device coupled to at least one of the body or the working part for detecting a motion of the body or the working part in an at least one direction;

wherein the controller is configured to control the drive circuit to make the brushless motor enter the braking mode when an amount of the motion of the body or the working part in the at least one direction exceeds a predetermined threshold, and wherein the controller is configured to control the drive circuit to make the brushless motor enter the braking mode when: (a) a value of an angular velocity at which the body or the working part rotates in the at least one direction is greater than a first predetermined angular velocity threshold and less than a second predetermined angular velocity threshold; and (b) a value of an angular displacement at which the body or the working part rotates in the at least one direction is greater than a predetermined angular displacement threshold.

2. The chain saw of claim 1, wherein the controller is further configured to control the drive circuit to make the brushless motor enter the braking mode when; the value of the angular velocity at which the body or the working part rotates in the at least one direction is greater than the second predetermined angular velocity threshold.

3. The chain saw of claim 1, wherein the motion detection device comprises a gyroscope sensor for detecting at least one of the value of the angular velocity or the value of the angular displacement at which the body or the working part rotates in at the least one direction.

4. The chain saw of claim 1, wherein the controller is configured to control the drive circuit based on a position of the rotor such that a direction of the braking electrical current of the brushless motor in the braking mode is opposite from a direction of the operating electrical current in the driving mode.

5. The chain saw of claim 1, wherein the braking mode comprises a first braking process, the brushless motor has a plurality of commutation positions, and areas between two adjacent ones of the plurality of commutation positions are sectors, and the controller is configured to control the drive circuit to reverse a direction of the operating electrical current of the brushless motor in the first braking process in each of the sectors based on each of the sectors where the rotor is located.

6. The chain saw of claim 1, wherein the braking mode comprises a first braking process, the brushless motor has a plurality of commutation positions, and areas between two adjacent ones of the plurality of commutation positions are sectors, and the controller is configured to control the drive circuit to reverse a direction of the operating electrical current of the brushless motor in the first braking process in at least one of the sectors based on at least one of the sectors where the rotor is located.

7. The chain saw of claim 6, wherein the controller is configured to control the drive circuit to short-circuit the brushless motor when a duration of the first braking process has reached a predetermined time period.

8. The chain saw of claim 6, wherein the controller is configured to control the drive circuit to short-circuit the brushless motor when a rotational speed of the rotor of the brushless motor has dropped to a predetermined rotational speed threshold after the brushless motor enters the braking mode.

9. The chain saw of claim 6, wherein the braking mode further comprises a second braking process and the controller is configured to control the drive circuit to short-circuit the brushless motor in the second braking process.

10. The chain saw of claim 1, further comprising a position detection device operably coupled to the brushless motor and configured to detect a position of the rotor of the brushless motor.

11. A drive assembly for a chain saw, comprising:
a brushless motor coupled to a saw chain and configured to drive the saw chain about a guide bar, the brushless motor having a driving mode and a braking mode, the brushless motor comprising a rotor;

a power supply device for providing an electrical energy for the brushless motor;

a drive circuit connected to the power supply device and the brushless motor for providing the electric energy of the power supply device to the brushless motor, the drive circuit providing an operating electrical current to the brushless motor in the driving mode to operate the saw chain, and the drive circuit providing a stopping electrical current to the brushless motor in the braking mode to stop movement of the saw chain;

a controller connected to the drive circuit for controlling the drive circuit;

a motion detection device coupled to the guide bar for detecting a motion of the guide bar in an at least one direction; and the controller is configured to:
when an amount of the motion of the guide bar in the at least one direction exceeds a predetermined threshold, control the drive circuit to make the brushless motor enter the braking mode, and control the drive circuit to make the brushless motor enter the braking mode when: (a) a value of an angular velocity at which the guide bar rotates in the at least one direction is greater than a first predetermined angular velocity threshold and less than a second predetermined angular velocity threshold; and (b) the value of an angular displacement at which the guide bar rotates in the at least one direction is greater than a predetermined angular displacement threshold.

12. The drive assembly of claim 11, wherein the motion detection device comprises a gyroscope sensor for detecting at least one of the value of the angular velocity or the value of the angular displacement at which the guide bar rotates in the at least one direction.

13. The drive assembly of claim 11, wherein the braking mode comprises a first braking process, the brushless motor has a plurality of commutation positions, and areas between two adjacent ones of the plurality of commutation positions are sectors, and the controller is configured to control the drive circuit to reverse a current direction of the brushless motor in the first braking process in at least one of the sectors based on the at least one of the sectors where the rotor is located.

14. The drive assembly of claim 13, wherein the controller is configured to control the drive circuit to short-circuit the brushless motor when a duration of the first braking process has reached a predetermined time period.

15. The drive assembly chain saw of claim 13, wherein the controller is configured to control the drive circuit to short-circuit the brushless motor when a rotational speed of the rotor of the brushless motor has dropped to a predetermined rotational speed threshold after the brushless motor enters the braking mode.

16. The drive assembly of claim 13, wherein the braking mode further comprises a second braking process, and the controller is configured to control the drive circuit to short-circuit the brushless motor in the second braking process.

17. A chain saw, comprising:
a body;
a working part mounted to the body, the working part comprising a guide bar and a saw chain, the saw chain being movable about the guide bar;
a brushless motor mounted within the body and coupled to the working part to drive the working part to work, the brushless motor having a driving mode and an emergency, braking mode, the brushless motor comprising a rotor;
a power supply device mountable to the body and electrically coupleable to the brushless motor to provide an electrical energy for the brushless motor;
a drive circuit connected to the power supply device and the brushless motor for providing the electric energy of the power supply device to the brushless motor, the drive circuit providing an operating electrical current to the brushless motor in the driving mode to operate the working part, and the drive circuit providing a stopping electrical current to the brushless motor in the braking mode to stop movement of the working part;
a controller connected to the drive circuit for controlling the drive circuit; and
a motion detection device coupled to at least one of the body or the working part for detecting a motion of the body or the working part in an at least one direction,
the controller is configured to:
control the drive circuit to make the brushless motor enter the braking mode when an amount of the motion of the body or the working part in the at least one direction exceeds a predetermined motion threshold, and
control the drive circuit to make the brushless motor enter the braking mode when a value of an angular velocity at which the body or the working part rotates in the at least one direction is greater than a predetermined angular velocity threshold.

* * * * *